Aug. 26, 1924.
A. BISHOP
POP CORN CANDY MIXER
Filed Dec. 27, 1921
1,506,155
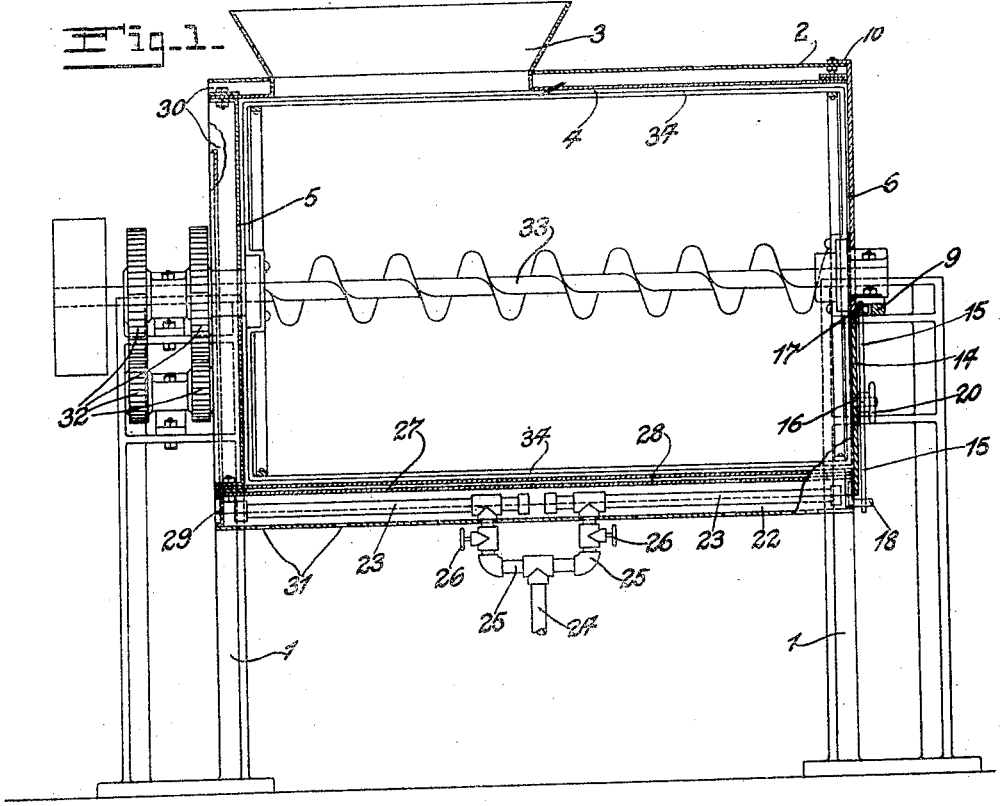
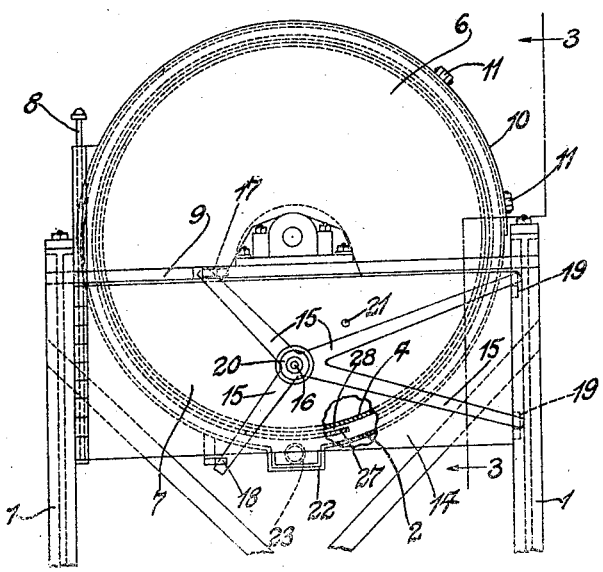
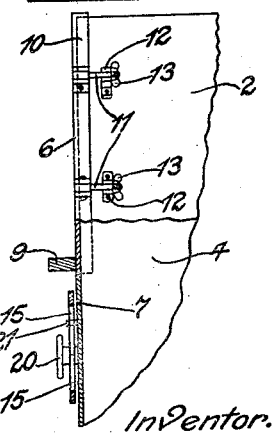
Inventor.
Addison Bishop,
by Poppy Kneeland
His Attorneys.

Patented Aug. 26, 1924.

1,506,155

UNITED STATES PATENT OFFICE.

ADDISON BISHOP, OF ST. LOUIS, MISSOURI.

POP-CORN-CANDY MIXER.

Application filed December 27, 1921. Serial No. 524,859.

*To all whom it may concern:*

Be it known that I, ADDISON BISHOP, a citizen of the United States, residing at the city of St. Louis and State of Missouri, have invented a new and useful Pop-Corn-Candy Mixer, of which the following is a specification.

This invention relates to popcorn candy mixers.

The present invention comprises the heating means for the machine disclosed in my prior patent dated January 24, 1922, No. 1,404,338.

The present invention relates specifically to a machine for mixing popcorn candy while the popcorn and the candy syrup are in a heated condition. My said prior patent covers the mixing devices and the present invention relates to the means for maintaining the popcorn candy in a heated condition while the popcorn candy and the candy syrup are being mixed.

An object of the invention is to provide novel and improved means for maintaining the popcorn candy in a heated condition while it is being mixed by operation of the machine.

Another object is to provide a highly improved and efficient machine for use in mixing popcorn candy.

Other objects will appear from the following description, reference being made to the drawing, in which—

Fig. 1 is a longitudinal sectional view of a machine embodying the principles of my present invention.

Fig. 2 is an elevation of the discharge end of the machine.

Fig. 3 is a view with parts in elevation and parts in section showing features of the discharge end of the machine.

In the embodiment of the invention shown, the machine is supported upon end frames 1. Upon the end frames 1 a heat confining jacket or shell 2 is stationarily supported and is preferably closed throughout its circumference except at the top where a feeding-in hopper 3 opens through the jacket and into a cylinder 4 stationarily supported inside the jacket.

The cylinder 4 is provided with an end wall 5 secured to the cylinder near one end thereof. The opposite end of the cylinder consists of an upper door 6 and a lower door 7, said doors being pivotally supported for movement to and from closed positions. The upper door 6 is mounted upon a hinge rod 8 for vertical and pivotal movements, and when in closed position, has its lower portion located between the end of the cylinder 4 and a transverse bar 9. The upper edge of the door 6 curves in conformity with the curvature of the wall of the jacket 2 and is provided with a flange 10 engaging over the jacket 2 when in closed position. The bar 9 serves to hold the upper door 6 and said door is provided with latches or clamps above the bar 9 for holding the door close against the end of the cylinder 4 and the jacket 2, causing said door to serve the double function of closing the upper portion of the end of the cylinder 4 as well as the upper portion of the surrounding heat space between said cylinder 4 and the jacket 2. Thus, said door serves to confine the material within the cylinder 4 and also to confine the heat within the space between the cylinder and the jacket. The latches mentioned comprise bolts 11 pivotally supported in connection with the flange 10 of the upper door and movable between the bifurcated arms of brackets 12 in connection with the jacket 2. Clamping nuts 13 on the bolts 11 may be adjusted to engage the brackets to effect binding or clamping engagement as required to clamp the upper door 6 closed. When it is desired to open the upper door the nuts 13 are loosened and the bolts 11 are disengaged from the brackets 12, after which the door is moved vertically on the hinge rod 8 a sufficient distance to disengage the lower edge of the door from the bar 9. The door 6 may then be swung open. When the door is moved to closed position it automatically drops to engage the lower portion thereof between the bar 9 and the end of the cylinder. The flange 10 engaging the jacket 2 stops downward movement of the door.

The lower door at the discharge end of the machine comprises a plate 14 also pivoted upon the hinge rod 8 and movable to and from position to close the lower end of the cylinder and also to close the lower portion of the space between the cylinder 4 and the jacket 2.

The latch device for the lower door 6 comprises a multiramose member 15 pivoted upon a support 16 in connection with the lower door, the arms of which member are movable into and out of latching engagement with a number of holders therefor. The holder 17 for one of the arms of the latch device is in connection with the upper door 6. When the upper door 6 is closed the holder 17 is in the recess with the bar 9. Another one of the holders 18 is in connection with the jacket 2 while a pair of holders 19 are in connection with the frame 1. By turning the device 15 in a counter-clockwise direction, all of the arms thereof are disengaged from the holders, leaving the door 7 free to open. A knob or wheel 20 in connection with the latch device 15 is operative to turn said latch device to disengage the arms thereof from the respective holders to unlatch the door. An abutment 21 on the door 7 stops turning movement of the latch device in a counter-clockwise direction.

The jacket 2 is formed with a burner chamber 22 immediately below the cylinder 4. In the embodiment of the invention shown the burner chamber includes a pair of burners 23, one of which extends toward the feeding-in end of the cylinder 4, and the other of which extends toward the discharge end of said cylinder. A fuel supply pipe 24 has branches 25 leading to the burners 23, each branch being equipped with an independently manipulative valve 26 whereby the passage of fuel to said burners may be controlled.

A shield 27 is located between the burners 23 and the lower side of the cylinder 4, being spaced from the cylinder by an air space or chamber 28. The shield 27 is immediately above the burners and deflects the flames and the heat laterally in both directions and, due to the construction mentioned, prevents burning or scorching of the material in the cylinder 4 which might result from overheating.

The heat confining chamber or space between the jacket 2 and the cylinder 4 is wholly closed at the discharge end of the cylinder 4 by the doors 6 and 7, and is closed at the opposite end by a member 29, except that near the top a discharge opening 30 is left. That is, the member 29 terminates some distance below the top of the machine leaving the space 30 open at the top so that the heated air has egress therethrough.

The bottom wall of the burner chamber 22 has a number of air inlet openings 31 therethrough to admit fresh air in order to maintain perfect combustion during operation of the machine.

The mechanism for agitating or stirring the material within the cylinder comprises a spiral rotary shaft 33 extending axially through the cylinder, and a number of strips 34 supported by the shaft near the cylinder wall. A train of gearing 32 constitutes means for rotating the shaft 33 and the strips 34 to stir or agitate the material in the cylinder.

In actual use and operation my invention has been found highly useful and practicable for the performance of all of its intended functions in an entirely satisfactory and efficient manner. So far as I am aware, my invention is the first machine that has been provided for the purpose for which it is intended. So far as known to me it is the first machine in which the material is heated properly while the agitator devices operate to move the material in opposite directions within the cylinder. The heating apparatus maintains the material in proper condition for the operation of the agitator devices.

I am aware that the machine may be modified in various particulars without departure from the nature and principle of the invention. I do not restrict myself to the precise construction and arrangement shown, but what I claim and desire to secure by Letters Patent is:—

1. A machine of the character described, comprising a stationary horizontal cylinder of relatively large diameter, a wall surrounding the cylinder and forming a horizontal annular space around said cylinder opening to atmosphere above the top of the cylinder at one end, means closing the opposite end of said space, means for conducting material through said wall and space and into said cylinder, and a heating device supported within said annular space between said cylinder and said surrounding wall.

2. A machine of the character described, comprising a stationary horizontal cylinder of relatively large diameter arranged to contain the material to be operated upon, a wall surrounding the cylinder and forming a horizontal annular heat confining space around the cylinder having one end closed and the opposite end opening to atmosphere near the top of the cylinder, means for conducting material downwardly through said wall and space and into said cylinder, and means located within said annular space and between the wall of said cylinder and said surrounding wall for heating the air in said space.

3. A machine of the character described, comprising a stationary cylinder of relatively large diameter arranged to contain the material to be operated upon, a wall surrounding the cylinder and forming a heat confining space around the cylinder, a heating device in said space below the cylinder, doors closing said cylinder and said space at one end, and a wall spaced from the opposite end of the cylinder and forming a heat confining space opening to the atmosphere near the top of the cylinder.

4. A machine of the character described, comprising a stationary cylinder of relatively large diameter, a feeding-in hopper for conducting material into the cylinder, a wall surrounding the cylinder and forming a space for confining heated air around the cylinder, a door closing said space at one end, a heating device supported within said space below the cylinder, and a deflector device supported within said space between said heating device and the cylinder wall.

ADDISON BISHOP.